US011975503B2

(12) United States Patent
Morasse

(10) Patent No.: US 11,975,503 B2
(45) Date of Patent: May 7, 2024

(54) CUPSTOCK WITH RIM-FORMATION INDEX AND ASSOCIATED METHODS AND RIMMED CUP PRODUCTS

(71) Applicant: CASCADES CANADA ULC, Kingsey Falls (CA)

(72) Inventor: Stéphane Morasse, Kingsey Falls (CA)

(73) Assignee: Cascades Canada ULC, Quebec (CA)

( * ) Notice: Subject to any disclaimer, the term of this patent is extended or adjusted under 35 U.S.C. 154(b) by 481 days.

(21) Appl. No.: 17/278,177

(22) PCT Filed: Oct. 18, 2019

(86) PCT No.: PCT/CA2019/051485

§ 371 (c)(1),
(2) Date: Mar. 19, 2021

(87) PCT Pub. No.: WO2020/077466

PCT Pub. Date: Apr. 23, 2020

(65) Prior Publication Data

US 2021/0347142 A1 Nov. 11, 2021

Related U.S. Application Data

(60) Provisional application No. 62/747,918, filed on Oct. 19, 2018.

(51) Int. Cl.
*B31C 7/02* (2006.01)
*B65D 3/06* (2006.01)
(Continued)

(52) U.S. Cl.
CPC .................. *B31C 7/02* (2013.01); *B65D 3/06* (2013.01); *D21B 1/12* (2013.01); *D21F 11/02* (2013.01)

(58) Field of Classification Search
CPC .... B31C 7/02; B65D 3/06; D21B 1/12; D21F 11/02
See application file for complete search history.

(56) References Cited

U.S. PATENT DOCUMENTS

| | | | |
|---|---|---|---|
| 6,379,497 | B1 | 4/2002 | Sandstrom et al. |
| 6,919,111 | B2 | 7/2005 | Swoboda et al. |

(Continued)

FOREIGN PATENT DOCUMENTS

| | | | |
|---|---|---|---|
| CA | 2971840 | A1 | 6/2016 |
| EP | 1 280 707 | B1 | 4/2006 |
| WO | 02/084026 | A1 | 10/2002 |

OTHER PUBLICATIONS

International Search Report and Written Opinion dated Dec. 16, 2019 for PCT/CA2019/051485 of which the subject application is a U.S. National Phase.

*Primary Examiner* — Michael C Miggins
(74) *Attorney, Agent, or Firm* — Wood, Phillips, Katz, Clark & Mortimer

(57) ABSTRACT

A cupstock for making rimmed cups, such as coffee cups, can be manufactured from recycled paper fibers while having a rim-formation index (RFI) and/or structural and flexural factors, based on certain properties of the cupstock to facilitate a quality rim. For example, the RFI can be based on the thickness, ring crush MD, bending stiffness MD, and areal density of the cupstock. The cupstock can be made from 100% recycled fibers from old corrugated cardboard (OCC) and provided with structural and flexural factors within respective ranges to ensure adequate rim formation when converted into a rimmed cup.

26 Claims, 5 Drawing Sheets

(51) Int. Cl.
*D21B 1/12* (2006.01)
*D21F 11/02* (2006.01)

(56) References Cited

U.S. PATENT DOCUMENTS

| | | | | |
|---|---|---|---|---|
| 7,767,049 | B2 | 8/2010 | Sadlier | |
| 7,955,670 | B2 | 6/2011 | Swoboda et al. | |
| 8,444,807 | B2 | 5/2013 | Colin et al. | |
| 10,232,580 | B2 | 3/2019 | Knauf et al. | |
| 10,562,659 | B2 | 2/2020 | Fortin et al. | |
| 10,731,296 | B2 | 8/2020 | Knauf et al. | |
| 2006/0286325 | A1 | 12/2006 | Swoboda et al. | |
| 2021/0347142 | A1* | 11/2021 | Morasse | D21B 1/12 |

* cited by examiner

CUPSTOCK WITH RIM-FORMATION INDEX AND ASSOCIATED METHODS AND RIMMED CUP PRODUCTS

TECHNICAL FIELD

The technical field generally relates to cupstock for producing rimmed cups, such as coffee cups and the like, as well as methods of producing such cupstock and rimmed cup products.

BACKGROUND

Cupstock used to produce coffee cups and the like are conventionally made using virgin fibers to provide the desired properties of the paperboard material used to make the cup and particularly its curled rim. Forming an adequate rim for a coffee cup can be relatively challenging particularly when using cupstock made from recycled paper materials and fibers.

There is indeed a need for technologies that can facilitate the use of recycled fibers for producing rimed cups and tubs that may be used for holding hot liquids or other materials.

SUMMARY

Cupstocks made from recycled fibers can be produced while ensuring it has a rim-formation index (RFI) above a threshold or a combination of flexural and structural factors within certain ranges in order to facilitate the formation of an adequate rim when the cupstock is converted into a rimmed cup. The cupstock can be made from 100% recycled fibers that may be obtained from old corrugated cardboard (OCC) as well as from trim and off-specification material. In one example, the RFI can be based on a thickness factor of the cupstock, a machine direction ring crush factor of the cupstock, a machine direction bending stiffness of the cupstock and an areal density of the cupstock. Various enhancements regarding cupstocks and rimmed cups made from recycled material are described herein.

In some implementations, there is provided a paperboard cupstock comprising fibers that are predominantly derived from recycled paper for formation into a cup having an integral upper rim, the cupstock having a rim-formation index (RFI) above a predetermined threshold, the RFI being determined based on a thickness factor of the cupstock, a machine direction ring crush factor of the cupstock, a machine direction bending stiffness of the cupstock and an areal density of the cupstock.

In some implementations, the RFI has the following formula:

$$RFI = \frac{RCT}{36\,\rho}(1+\varepsilon) \text{ where } \varepsilon = \frac{t^2 RCT}{S_b}$$

In some implementations, the predetermined threshold is determined based on a predetermined RCT/36ρ between about 400 and about 550 J/Kg, between about 450 and about 500 J/Kg, or between 350 and 580 J/Kg, or between 370 and 580 J/Kg. In some implementations, the RFI is within a predetermined range that is about 370 to about 580 J/Kg, about 400 to about 550 J/Kg, or about 430 to about 500 J/Kg or about 450 to about 500 J/Kg. In some implementations, the thickness is between 250 μm and 500 μm, or between 300 μm and 400 μm, or between 450 μm and 480 μm. In some implementations, the machine direction ring crush is between 60 and 260 pounds per six inches, or between 100 and 200 pounds per six inches or between 150 and 200 pounds per six inches. In some implementations, the machine direction bending stiffness is between 4 and 55 mNm, or between 8 and 50 mNm or between 35 and 50 mNm. Note that the bending stiffness can be based on the Tappi method where $S_b$ is derived (calculated) from the bending force F (mN) and also from the geometry of the test, $S_b(\text{mNm})=60\ FL^2/(\pi*a*b)$ where L is the bending length (span, 50 mm), a is the bending angle (usually 15°) and b is the sample width. Thus, the above bending stiffness ranges correspond to bending force ranges between 50 and 700 mN, or between 200 and 600 mN or between 400 and 600 mN, respectively. In some implementations, the areal density of the cupstock can be between 0.15 and 0.4 $Kg/m^2$, between 0.2 and 0.4 $Kg/m^2$, or between 0.25 and 0.40 $Kg/m^2$, or between 0.25 and 0.35 $Kg/m^2$. In some implementations, the cupstock further has a rugosity of less than about 400 Sheffield units. In some implementations, the predetermined threshold of the RFI is 370 J/kg, 400 J/kg, or 450 J/kg, for example. In some implementations, the fibers used in the cupstock are at least 60 wt % derived from recycled paper, at least 70 wt % derived from recycled paper, at least 80 wt % derived from recycled paper, or at least 90 wt % derived from recycled paper, or all of the fibers used in the cupstock are derived from recycled paper. In some implementations, all of the recycled paper that is used is derived from old corrugated cardboard (OCC). In some implementations, at least some of the recycled paper is derived from OCC. In some implementations, at least some of the recycled paper includes or is derived from trim material and/or off-specification material from a corrugated cardboard manufacturing process. In some implementations, the paperboard cupstock is formed as a multi-ply board. In some implementations, the paperboard cupstock is formed as a two-ply board. In some implementations, the paperboard cupstock is calendered. In some implementations, the paperboard cupstock comprises a coating. In some implementations, the coating comprises low density polyethylene (LDPE). In some implementations, the coating comprises a water-based coating. In some implementations, the coating comprises polylactic acid (PLA) polymers. In some implementations, the coating is provided at least on a side of the cupstock that becomes an inner surface of the rimmed cup. In some implementations, the coating is only provided on the side of the cupstock that becomes the inner surface of the rimmed cup. In some implementations, the cupstock further includes a second coating provided on a second side of the cupstock that becomes an outer surface of the rimmed cup.

In some implementations, there is provided a paperboard cupstock comprising fibers that are predominantly derived from recycled paper for formation into a cup having an integral upper rim, the cupstock having a rim-formation index (RFI) that is proportional to a deformation factor and a compression strength factor, and wherein the RFI is provided such that the deformation factor and the compression strength factor are within a selected rim-formation operating envelope.

In some implementations, the deformation factor is (1+ε) where ε is:

$$\varepsilon = \frac{t^2 RCT}{S_b}$$

where t is the thickness of the cupstock, RCT is the ring crush in the machine direction, and $S_b$ is the bending stiffness in the machine direction.

In some implementations, the compression strength factor is RCT/36ρ where ρ is the areal density of the cupstock.

In some implementations, the RFI has the following formula:

$$RFI = \frac{RCT}{36\,\rho}(1+\varepsilon) \text{ where } \varepsilon = \frac{t^2 RCT}{S_b}$$

where t is the thickness of the cupstock, RCT is the ring crush in the machine direction, $S_b$ is the bending stiffness in the machine direction, and ρ is the areal density of the cupstock.

In some implementations, the deformation factor is above about 1.028, above about 1.03, above about 1.035, or above about 1.04. In some implementations, the deformation factor is between about 1.03 and about 1.05, or between 1.03 and 1.04. In some implementations, the compression strength factor is above about 350 J/Kg, above about 370 J/Kg, above about 380 J/Kg, above about 390 J/Kg, above about 400 J/Kg, above about 420 J/Kg, above about 430 J/Kg, above about 440 J/Kg, or above about 450 J/Kg. In some implementations, the compression strength factor is below about 550 J/Kg, below about 530 J/Kg, below about 510 J/Kg, below about 500 J/Kg, below about 490 J/Kg, or below about 480 J/Kg. In some implementations, the fibers used in the cupstock are at least 60 wt % derived from recycled paper, at least 70 wt % derived from recycled paper, at least 80 wt % derived from recycled paper, or at least 90 wt % derived from recycled paper. In some implementations, all of the fibers used in the cupstock are derived from recycled paper. In some implementations, all of the recycled paper that is used is derived from OCC. In some implementations, at least some of the recycled paper is derived from OCC. In some implementations, at least some of the recycled paper includes or is derived from trim material and/or off-specification material from a corrugated cardboard manufacturing process. In some implementations, the paperboard cupstock is formed as a multi-ply board. In some implementations, the paperboard cupstock is formed as a two-ply board. In some implementations, the paperboard cupstock is calendered. In some implementations, the paperboard cupstock comprises a coating. In some implementations, the coating comprises low density polyethylene (LDPE). In some implementations, the coating comprises a water-based coating. In some implementations, the coating comprises polylactic acid (PLA) polymers. In some implementations, the coating is provided in at least a side of the cupstock that becomes an inner surface of the rimmed cup. In some implementations, the coating is only provided on the side of the cupstock that becomes the inner surface of the rimmed cup. In some implementations, the cupstock includes a second coating provided in a second side of the cupstock that becomes an outer surface of the rimmed cup.

In some implementations, there is provided a cupstock comprising fibers that are predominantly derived from recycled paper for formation into a cup having an integral upper rim, the cupstock having a rim-formation index (RFI) above a predetermined threshold, the RFI being based on a ratio between compression strength and flexural rigidity.

In some implementations, there is provided a cupstock comprising fibers that are predominantly derived from recycled paper for formation into a cup having an integral upper rim, the cupstock having a deformation factor and a compression strength factor within respective ranges to be within a rim-formation operating envelope.

It is noted that such cupstocks may have one or more features as described above or herein.

In some implementations, there is provided a rimmed cup made from the cupstock as defined above or herein.

In some implementations, there is provided a process for manufacturing a cupstock for use in making a rimmed cup with an integral rim, the process comprising: pulping recycled paper to form a pulp; screening and cleaning the pulp to form a screened pulp; refining the screened pulp to form a refined pulp; subjecting the refined pulp to sheet formation to form the cupstock; and controlling one or more of the steps of the process such that the cupstock roll has a rim-formation index (RFI), wherein (i) the RFI is above a predetermined threshold and is determined based on a thickness factor of the cupstock, a machine direction ring crush factor of the cupstock, a machine direction bending stiffness of the cupstock and an areal density of the cupstock; or (ii) the RFI is proportional to a deformation factor and a compression strength factor, and wherein the RFI is provided such that the deformation factor and the compression strength factor are within a selected rim-formation operating envelope; or (iii) the RFI is above a predetermined threshold and is based on a ratio between compression strength and flexural rigidity.

In some implementations, the process includes subjecting the refined pulp to sheet formation comprises: spreading the refined pulp to produce a pulp layer; draining the pulp layer to form a ply; combining plies together to form a multi-ply paperboard; pressing the multi-ply paperboard to form a pressed board; and drying the pressed board to form a dried board that forms the cupstock. In some implementations, the process includes calendering the dried board to form a calendered board that forms the cupstock. In some implementations, the process includes winding the calendered board to form a cupstock roll of the cupstock. In some implementations, the process includes the cupstock produced by the process has one or more further features describe above or herein.

In some implementations, the process includes process for manufacturing a cupstock for use in making a rimmed cup with an integral rim, the process comprising: pulping recycled paper to form a pulp; screening and cleaning the pulp to form a screened pulp; refining the screened pulp to form a refined pulp; subjecting the refined pulp to sheet formation to form the cupstock; and controlling one or more of the steps of the process to ensure the cupstock as defined above or herein.

BRIEF DESCRIPTION OF THE DRAWINGS

FIGS. 6*a* and 6*b* are the top two figures from left to right respectively; and FIGS. 6*c* and 6*d* are the bottom two figures from left to right respectively.

FIGS. 7*a* and 7*b* are the top two figures from left to right respectively; and FIGS. 7*c* and 7*d* are the bottom two figures from left to right respectively.

DETAILED DESCRIPTION

Figure 1:
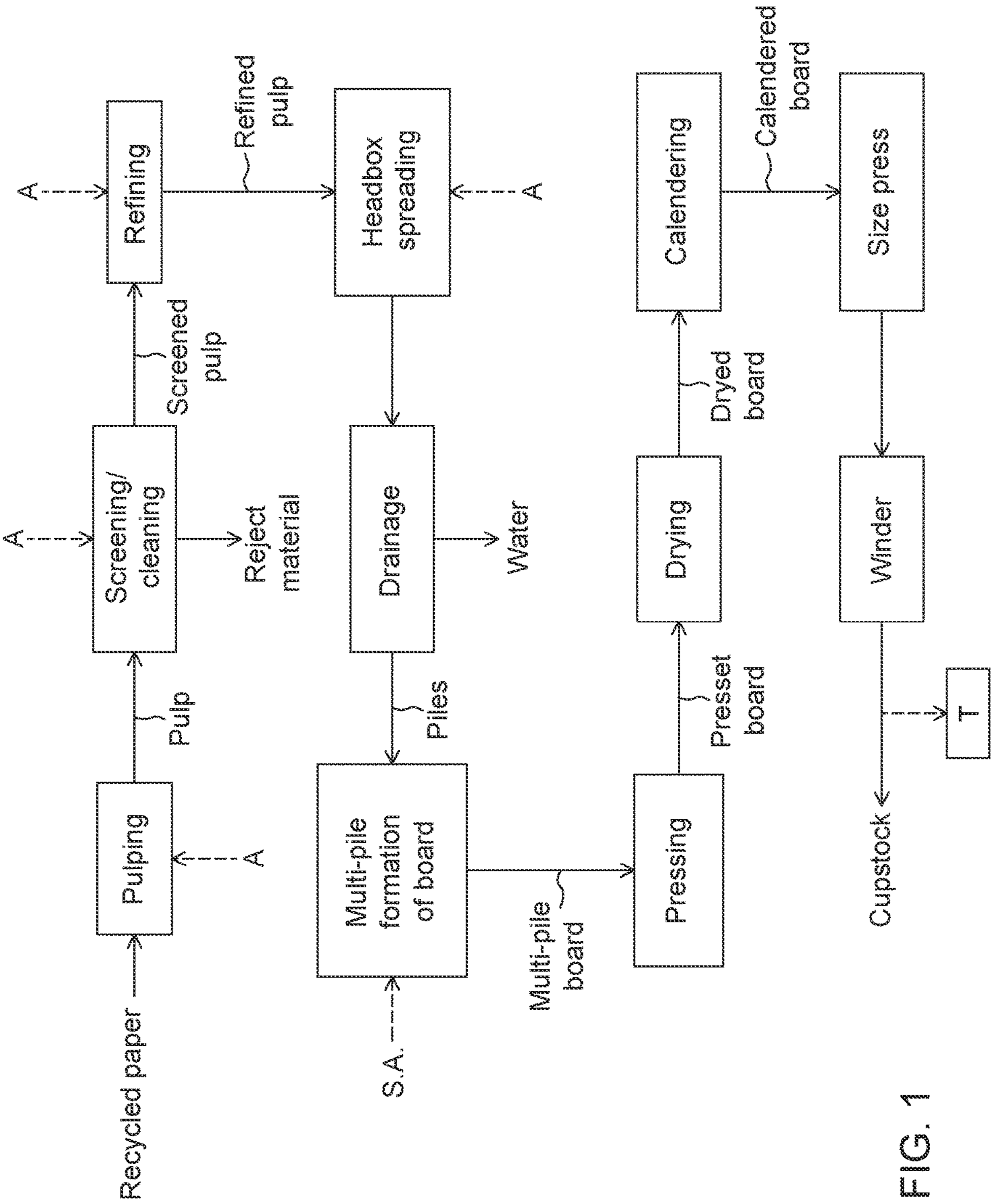
FIG. 1 is a block flow diagram of an example process for producing cupstock using recycled paper as a feedstock.

Various techniques are described herein for providing a cupstock substantially composed of recycled paper while having properties that facilitate forming a rimmed cup having a quality rim. The cupstock can include a significant proportion of recycled paper fibers, and the properties of the cupstock can be tailored using a rim-formation index (RFI) such that the cupstock can be formed into rimmed cup. The properties of the cupstock can be tailored such that it has a flexural component and a structural component within respective operating envelopes such that the cupstock can be formed into rimmed cup with adequate rim properties.

Some features and implementations of the cupstock, its method of manufacture as well as rimed cups that can be made using the cupstock will be described in further detail below.

Rim-Formation Index (RFI) and Flexural and Structural Components of Cupstock

In some implementations, the rim-formation index (RFI) of the cupstock can be based on several properties of the cupstock and can represent a balance between its structural and flexural properties.

In some implementations, the RFI can be based on key factors, as described by equation 1 below:

$$RFI\left[\frac{J}{Kg}\right] = \frac{RCT}{36\,\rho}(1+\varepsilon+\varepsilon^2+\ \ldots\ ) \tag{1}$$

where ε is a unitless factor, as described by equation (2):

$$\varepsilon = \frac{t^2 RCT}{S_b}\left(\frac{[m^2][N/m]}{[N\ m]}\right) \tag{2}$$

based on the thickness of the cupstock (t), the ring crush (RCT) of the cupstock, the bending stiffness ($S_b$) of the cupstock and the areal density (ρ, which can also be referred to as basis weight) of the cupstock. The ring crush and bending stiffness properties can be the machine direction (MD) properties rather than cross direction (CD). The ring crush and bending stiffness properties are preferably in the direction that will eventually be the vertical direction of the cup formed from the cupstock.

One could interpret ε as a deformation of the material, under a flexural load, similar to a deformation under a compression load or a tension load.

In one example, the RFI can be generally approximated by taking only the first two terms in equation (1), as follows:

$$RFI = \frac{RCT}{36\,\rho}(1+\varepsilon) \tag{3}$$

Equation (3) can also be viewed as having two sub-components: a structural component RCT/36ρ or $RFI_{SC}$, and a flexural component $(t^2)(RCT^2)/36\rho S_b$ or $RFI_{FC}$. In some instances, a cupstock can be produced for which one of the components is adequate or well above adequate, whereas the other component is not, and in such cases the adequate component can be removed from the determination while the inadequate component can be the focus to ensure a good rim. For example, in the event the $RFI_{SC}$ of an example cupstock is quite high and well above adequate, the $RFI_{FC}$ can be taken as the main sub-component that must be brought above a given threshold to ensure a good rim. In other words, if one wants to improve only the flexural component of the overall index, then $RFI_{FC}=[(t^2)(RCT^2)]/[36(\rho)(S_b)]$ can be taken as the main variable.

Figure 5:
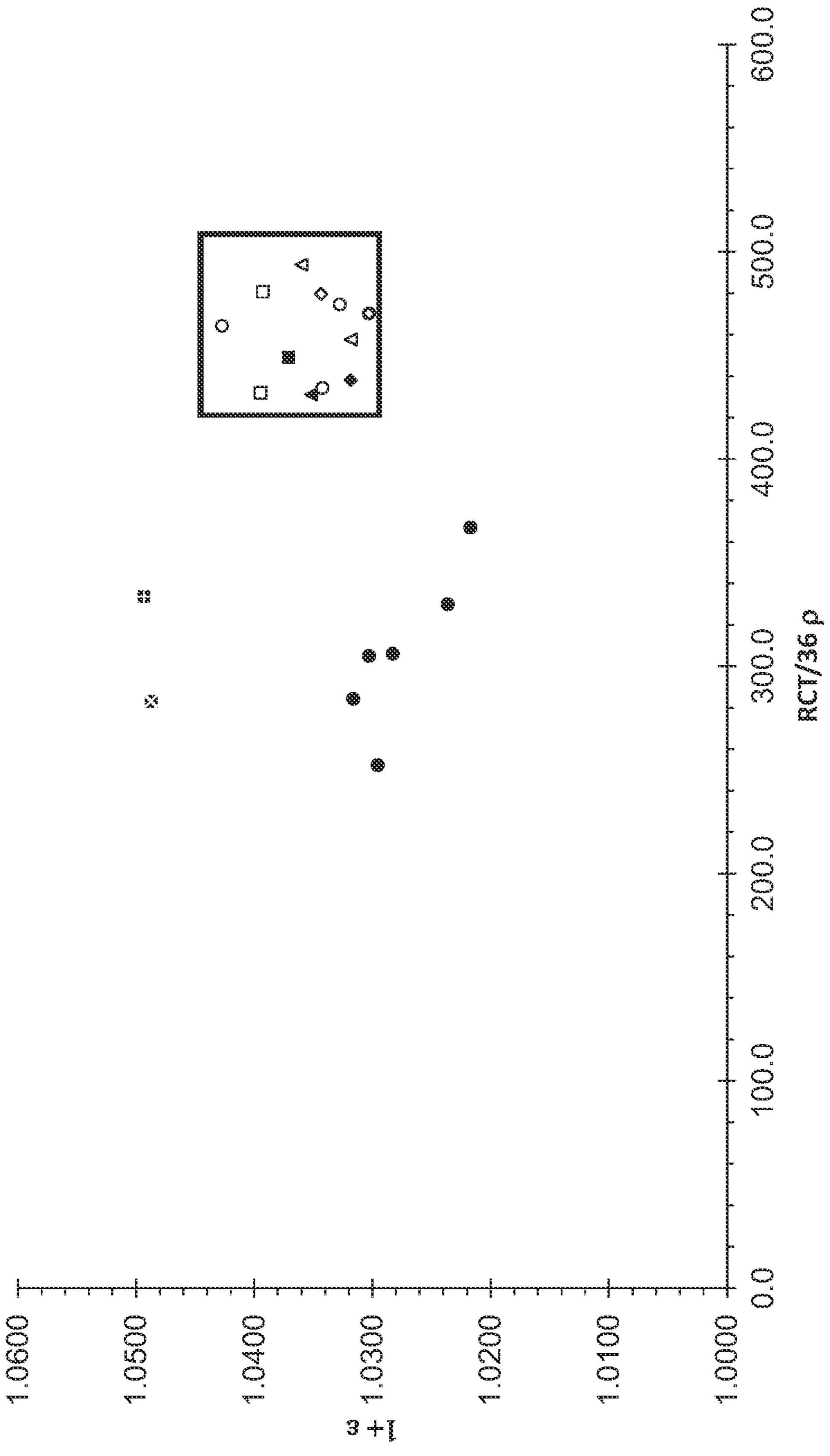
FIG. 5 is a graph of (1+ε) versus RCT/36ρ showing an example optimal envelope for cupstock properties.
Figure 6A:
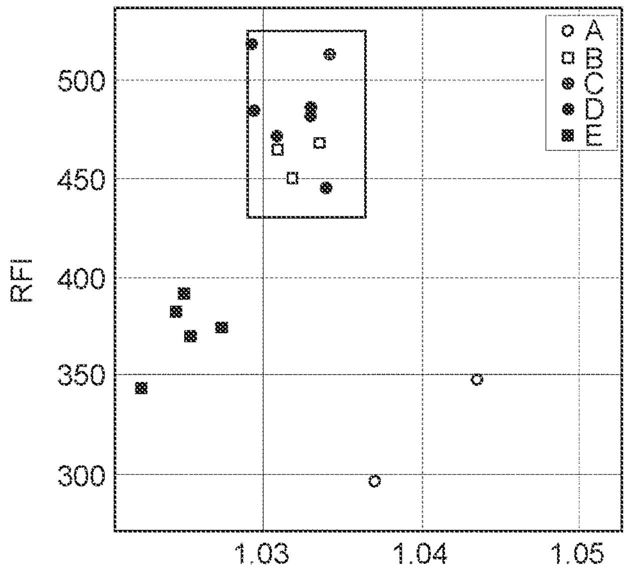
FIGS. 6*a* to 6*d* are graphs of components showing an example of a preferred envelope for cupstock properties.
Figure 6B:
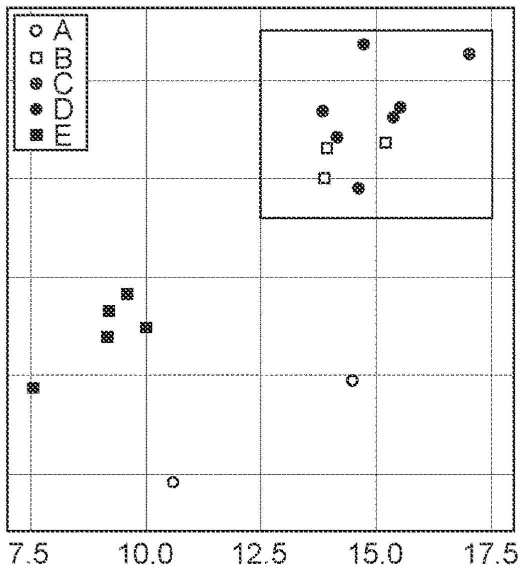
Figure 6C:
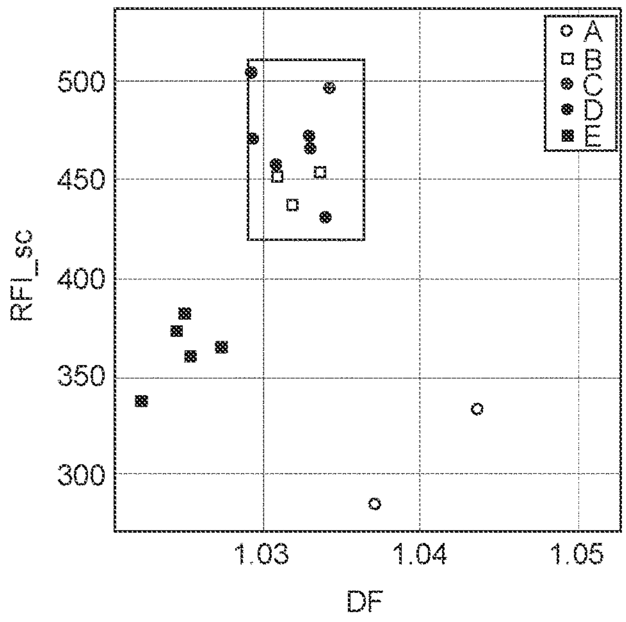
Figure 6D:
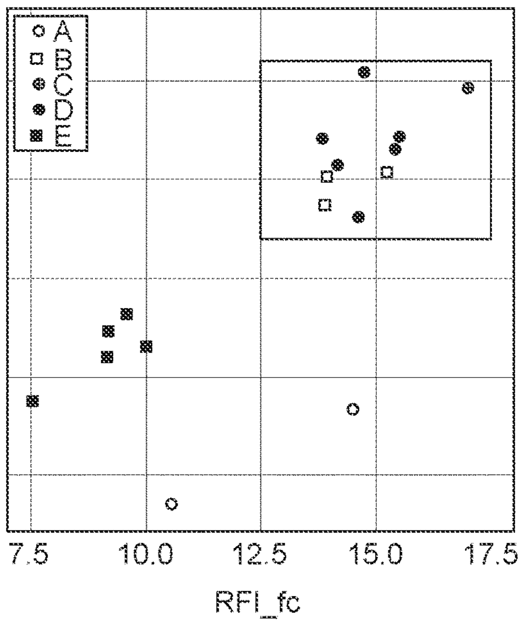
Figure 7A:
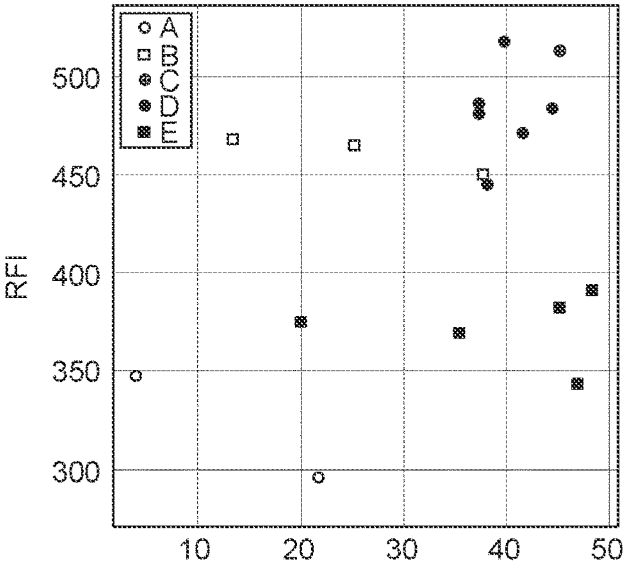
FIGS. 7*a* to 7*d* are additional graphs of variables for cupstock properties.
Figure 7B:
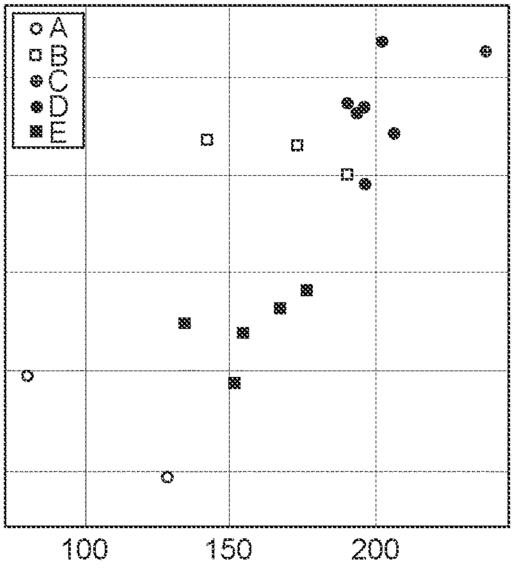
Figure 7C:
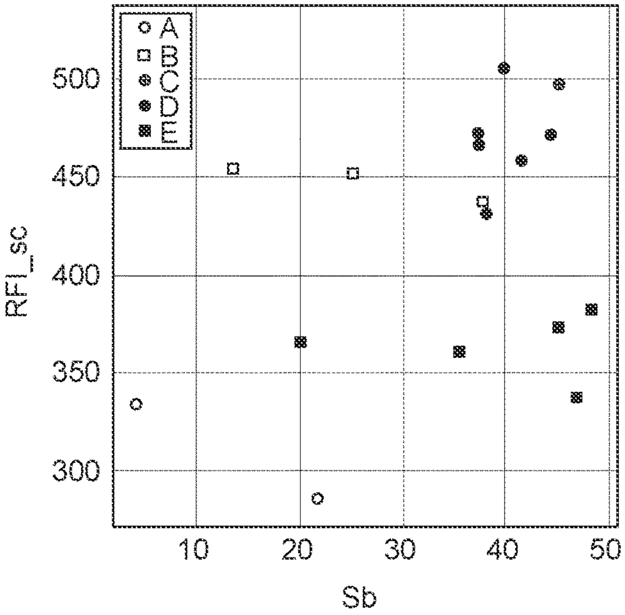
Figure 7D:
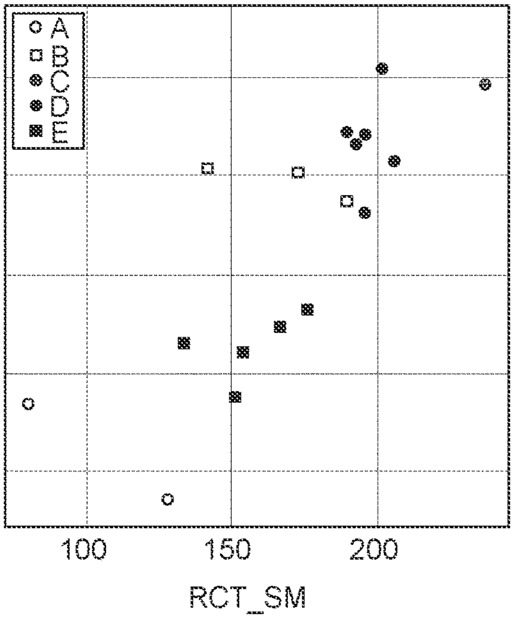

To illustrate this point, consider FIG. 5, which shows (1+ε) versus RCT/36ρ, for various different cupstock samples that were produced at different processing plants. The cluster of data points around (1+ε)=1.03 to 1.02 approximately have both low $RFI_{SC}$ and $RFI_{FC}$ and thus the overall RFI including both sub-components requires improvement to be within an optimal operating window (e.g., see the square region in this example). However, the two data points with (1+ε)=1.05 (or 1.044) approximately have quite a high $RFI_{FC}$ and thus the flexural properties of these cupstocks are already well above adequate; thus for these cupstocks, the $RFI_{SC}$ can be the focus of the work to ensure it is increased from the range of 300-350 up to a range of 400-500 or 425-500 approximately. It was found that efficient cupstock assessment and development could be achieved by determining sub-components $RFI_{SC}$ and $RFI_{FC}$ and then, if one of these sub-components was above the requirements (e.g., 10%, 15%, 20% or more above a required value), then only the other sub-component could be worked on to ensure that the cupstock will have an overall RFI that is sufficient to provide a good rim. Of course, the overall RFI can also be taken when developing and testing cupstocks to ensure that a good rim will be achieved.

It should also be noted that other examples of RFIs, and its sub-components, can be provided based on other particular tests and/or variables. For example, tests that are correlated with or similar to the ring crush test can be used to provide an alternative variable indicating the edgewise compression strength of the cupstock. Similarly, alternative test methods other than bending stiffness tests can be used to indicate the cupstock's resistance against deformation in certain directions. In some implementations, the properties are determined based on Tappi methods, examples of which are listed further below.

It has been found that providing a cupstock having an RFI combining for example an optimal range or minimum of RCT/36ρ and an optimal range or minimum of deformation (1+ε) above a threshold value can enable the formation of a rimmed cup having an adequate rim even when using high proportions of recycled paper to make the cupstock. Indeed, cupstock made with 100% recycled paper fibers have been made while ensuring an optimal RFI and/or sub-components to consistently enable adequate rim formation in cups that have sidewalls within an integral rim at the top. In some examples (see FIG. 5), the RFI as described above was determined for several samples of cupstock and it was found that combining a value of RCT/36ρ between 400 and 500 J/Kg (or between 425 and 500 J/Kg) and a deformation term (1+ε) above 1.03 were advantageous to facilitate the formation of an adequate integral rim when using 100% recycled paper fibers as well as providing good overall strength of the cup (a combination of bending stiffness and compression strength). Generally, (1+ε) can be viewed as an example deformation factor while RCT/36ρ is an example compression strength factor. It has been found that having an RFI above a predetermined threshold where the RFI is proportional to both deformation and compression strength factors can facilitate good rim formation when the cupstock fibers are substantially or wholly composed of recycled fibers. It has also been found that providing a cupstock with flexural and structural components that are above respective minima or within respective ranges, can facilitate good rim formation when the cupstock fibers are substantially or wholly composed of recycled fibers. Such techniques enable predictable and reliable manufacture of cupstock using recycled fibers. It has also been found that not providing a cupstock with flexural and structural components as described herein may lead to a required reduction of the process speed of the rim formation process (e.g., using a cup forming machine) to meet quality specifications which could be detrimental to the cost effectiveness of the cup forming process.

Cupstock Structures and Characteristics

In some implementations, the cupstock can be formed as a two-ply paperboard and can be manufactured based on methods that will be described in further detail below. The cupstock could also be formed as a single-ply board. Board made of three ply and more could also be used in theory for cupstock, but since such multi-ply boards are typically made to optimize bending stiffness which could be detrimental to achieving desired values for the RFI and/or the flexural and structural components, the manufacture of the three or more ply boards would have to be adapted accordingly.

The thickness of the cupstock can be between 250 μm and 500 μm or 10 to 20 points. The cupstock should have a rugosity of less than about 400 Sheffield units. The mechanical properties, such as bending stiffness and compression strength, will typically be a function of the basis weight of the board. The bending stiffness index would typically be in the range of 0.5 to 1.0 $Nm/(m^2/Kg)^3$ in the machine direction (MD), for example. The bending stiffness index of the cupstock can be in the cross direction (CD), which would usually be lower than the one in Machine Direction, depending on the orientation ratio of the paper machine in question. The compression strength index, which can be a ring crush based index expressed as RCT/36ρ, can preferably be between 400 and 500 (J/Kg), although it may be within other ranges (e.g., 375 to 550 J/Kg, or 350 to 550 J/Kg). The flexural component can be preferably between about 1.03 to about 1.035, although it too may be within other ranges (e.g., 1.035 to 1.045). The sub-components can be within alternative ranges depending on the specific variables and units that are used to construct the components. Finally, the areal density of the cupstock can be between 0.15 and 0.4 $Kg/m^2$ or between 0.2 and 0.4 $Kg/m^2$ or about 0.35 $Kg/m^2$. Within the above-mentioned ranges of different properties, the RFI can be maintained within an operating window, e.g. as per the box of FIG. 5, to maintain quality formation of the integral rim of the rimmed cup.

For the properties that are direction dependent (machine direction versus cross direction), such as the ring crush and the bending stiffness, it is preferred to use the direction that will eventually be the vertical direction of the rimmed cup. In other words, if the vertical direction of the cup corresponds to the machine direction of the cupstock, which is often the case, then the machine-direction ring crush and bending stiffness can be used to determine the RFI. If, however, the vertical direction of the cup corresponds to the cross direction of the cupstock, then the cross-direction ring crush and bending stiffness can be used to determine the RFI.

In some implementations, the cupstock can also have at least 50 wt %, 60 wt %, 70 wt %, 80 wt %, 90 wt % or about 100 wt % recycled paper for its fibers. In some alternative scenarios, the cupstock could include at least 30 wt %, 40 wt % or 45 wt % recycled paper for its fibers with the remaining fiber content being virgin fibers. It can also contain certain chemical additives used in the process of forming the cupstock, and can include a coating that is tailored for a desired application of the cup end product, for example.

The recycled fibers can be combined with virgin fibers in the manufacturing process to make the cupstock, although 100% recycled fibers can be used. The recycled and virgin fibers can each come from various sources and upstream processes, and can have various characteristics and properties, some of which will be described below.

The virgin fibers, if present, can be derived from hard or soft wood, for example. The soft and/or hard wood material can also be subjected to various different cooking and pulping operations to obtain the virgin fibers for incorporation into the cupstock.

The recycled fibers can be derived from various recyclable materials. Preferably, the recyclable material includes old corrugated cardboard (OCC), which is a type of post-consumer waste. In some implementations, all of the fibers used to make the cupstock are from OCC. Other recyclable materials that can be used include clippings or trim material from board manufacturing (e.g., DLK double line clippings, or "DLK"), as well as off-specification board materials. IN one example, the OCC, trim material and/or off-spec material used to make the cupstock can be from Cascades®. It should also be noted that trim material and/or off-spec material that may be used in the process may be obtained internally (i.e., from the same manufacturer that is making the cupstock) or may be acquired from another manufacturer. The recyclable material can itself include a mixture of post-consumer material and post-production material, depending on the particular methods of manufacture and starting material used to produce it. It is also noted that the recyclable material can include small or trace amounts of other recycled paper materials.

The process may include a pre-sorting or cleaning step to ensure that clean recyclable material is used. The OCC that is used can have certain characteristics, such as being composed of a mixture of hard wood (e.g., 0 to 30 wt %) and soft wood (e.g., 70 to 100%), having some fragmented fibers, some minor amount of debris, and having medium fibrillation, for example.

In addition, different types of recyclable materials can be combined in various proportions to provide the feedstock for processing to make the cupstock. For example, the recyclable material that are used can be OCC at 100%, or OCC at a lower proportion such as 90% with the remainder being trim and/or off-spec materials (such as DLK).

Process of Manufacturing the Cupstock

While an example process will be described below, it should be noted that various different processes configurations and combinations of steps and operating conditions can be used for producing the cupstock.

Referring to FIG. 1, showing an example process, the cupstock can be manufactured from recycled paper using a number of steps. The recycled paper can be subjected to pulping to produce a pulp. The pulping step is mainly for redisperse the fibers into water, and can include a very coarse cleaning of the pulp.

The pulp can then be subjected to screening/cleaning. In this step, many stages are possible, such as primary, secondary and tertiary screening and cleaning stages, depending on the particular setup of the mill, for example.

The screened pulp can then be subjected to refining to develop strength of the material. The refining can be controlled to generate refined pulp with higher or lower strength. In some implementations, if a cupstock sample is tested and found to have an RFI or sub-component that is lower than desired, the refining can be adjusted accordingly to increase the RFI, for example.

It should be noted that chemical additives, indicated generally with (A) in FIG. 1, can be provided at one or more of the above-mentioned steps. For example, retention aids, drainage aids, dry strength agents and/or sizing agents can be added at one or more of these steps, and optionally at the subsequent spreading step.

The refined pulp can then be subjected to sheet formation, which can include a number of optional sub-steps, some of which will be described below.

The refined pulp can be spread uniformly on a web and this is generally done using a headbox. The layer of pulp is then subjected to drainage, which can be done using a Fourdrinier table. One can also use a cylinders machine. In the next step, separate plies are combined or merged into a single board. Strength additives, such as starch, can be applied (e.g., shower application) to increase bonding strength between the plies, if desired.

The multi-ply board is then subjected to pressing followed by drying. The pressed and dried board can then be subjected to calendaring, which enables a smooth surface finish. Calandered paperboard can be desirable for printability of coffee cups and other cups to receive hot liquids having certain compositions. An optional step after calendaring can be to supply the board to a size press.

Finally, the board is fed to a winder to produce the final roll of paperboard for use as cupstock. The cupstock rolls can then be subjected to further treatments (e.g., coating) and then used to manufacture rimmed cups.

Since each manufacturing process, mill setup, and input materials can vary from case to case, a target range of RFI and/or flexural/structural components can be predetermined for a given set of raw materials and processing units such that a minimum threshold of the RFI and/or flexural/structural components is determined for formation of a quality integral rim for a rimmed cup. Based on example work and experimentation that have been performed, it was found that an example $RFI=RCT/36\rho[1+\varepsilon]$ had a threshold of about 450 J/Kg in the context of using up to 100% recycled OCC as feedstock for making the cupstock. Other particular RFI formulae, threshold values and optimal operating windows, can be provided for manufacturing cupstock capable of forming a quality rim.

During manufacturing, samples of the cupstock can be tested for various properties, such as thickness, ring crush MD, bending stiffness MD and areal density such that these variables or analogous variables are tracked as the cupstock is manufactured. If one variable (e.g., ring crush MD) is found to decrease from an ideal value, the manufacturing process can be modified in order to ensure that the RFI minimum threshold and/or sub-components minima are maintained by modifying another property, e.g., by decreasing bending stiffness and/or areal density, by increasing thickness of the cupstock. Thus, if a given variable changes and would result in a corresponding decrease in the RFI and/or one or more sub-component, the manufacturing process can be controlled to return that variable back to a desirable level and/or to change one or more other variables of the RFI and/or sub-components in order to maintain the RFI and/or sub-component values within a desired operating window.

As described by equation (3), the RFI depends on two main factors, the compression strength factor ($RCT/36\rho$) and the deformation factor ($1+\varepsilon$). The compression strength index can be influenced by the fibre type, such as hardwood or softwood, bleached or unbleached, virgin or recycled, for example. The refining intensity of the fibres, as well as the use of strength additives such as starch, can also have an impact on the compression strength of the paper.

On the other hand, the deformation factor ($1+\varepsilon$) may depend mainly on the ratio of (thickness times compression strength) over bending stiffness, and can be influenced by the same factors as for the compression strength factor, as well as operational factors of the paper machine, such as the "draw" (section where the forming web is without any mechanical support) or the pressure at the different press sections.

Thus, the compression strength and deformation factors can be modified by changing one or more of the variables mentioned above.

Rimmed Cups

As mentioned above, the cupstock can be used to make rimmed cups that can be used for receiving and containing various materials, such as coffee, tea, soup, ice cream, or other foods, liquids or other materials. The cupstock can be manufactured depending on the desired end-use by adding certain agents or providing certain other properties to the cupstock depending on the form of the cup to be made, the contents to be received, the properties of the contents in terms of modifying the properties of the cup, and other factors.

In the context of the present description, the term rimmed "cup" should be understood to include containers used to hold liquids or other materials and have an integral rim at an upper end thereof. The "cups" include receptacles of various shapes and sizes, which can be generally referred to as cups, tubs, bowls, containers, and so on. A preferred type of rimmed cup in the context of the present description is coffee cups or similar cups that are used to hold hot consumable liquids although other types of cups can also be produced for containing cold liquids, ice cream, and the like.

Figure 3:
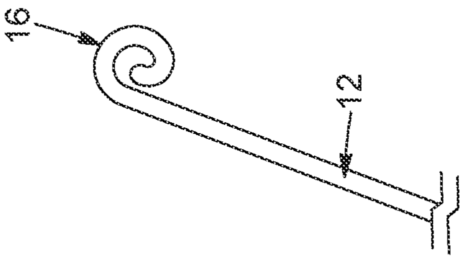
FIG. 3 is a cut side view schematic showing part of a rim and side wall of a rimmed cup.
Figure 2:
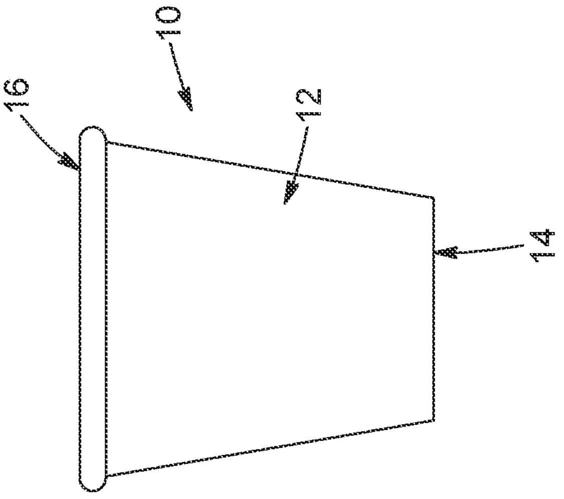
FIG. 2 is a side plan schematic of an example rimmed cup.

In some implementations, referring to FIG. 2, the cup 10 has sidewalls 12, a bottom 14 and an upper rim 16 that is integral with the upper part of the side walls and extends the entire perimeter of the upper portion. The rim 16 is integrally formed with the sidewalls of the cup 10 using a rim-making process. An example rim 16 can be seen in FIG. 3 in a cut view. The quality rim 16 that is formed should not have broken or cracked or angular parts on its outer surface, but rather has a generally smooth and continuous structure particularly at the outer surface. Some cracking, breakage or fraying can be permissible on the inner hidden side of the rim.

In some implementations, the bottom of the cup is formed using a bottom cupstock material, which can be the same as the cupstock used to form the sidewalls or a different material. In one example, the bottom cupstock material can have the same composition and properties as the side wall cupstock, while having a smaller thickness.

Figure 4:
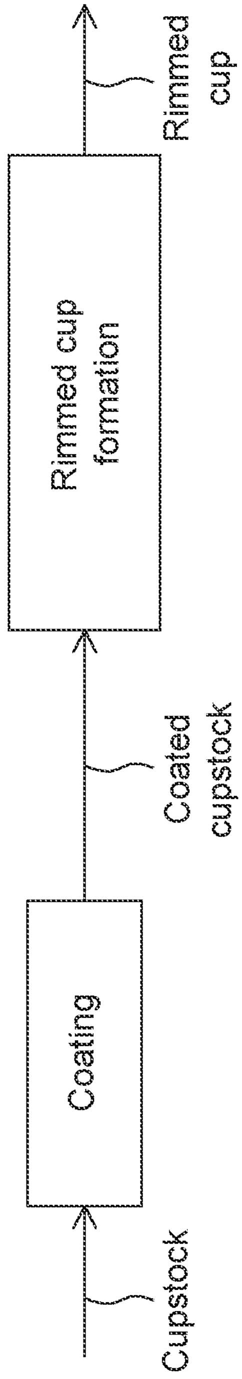
FIG. 4 is a block flow diagram of an example process for making a rimmed cup from cupstock.

In addition, the cups that are formed can have various dimensions and volumes. For coffee cups, the cups can have a volume of 8 oz, 10 oz, 12 oz or 16 oz, for example. Experiments to assess rim formation were conducted on various different cup volumes and found that the RFI remained in the same optimal region for different cup volumes. Other cup volumes are also possible. The rim that is formed at the top of the sidewalls can have a standard size used in conventional cups. In one example, the rim has a diameter of 3.3 to 3.5 mm, although other dimensions are also possible. It is also noted that smaller cups can have a more solid structure due to their dimensions and thus may be able to be made with thinner and lighter cupstocks. Referring to FIG. 4, the cupstock that is produced as a paperboard material can be further processed or treated to form a cupstock with enhanced properties for conversion into rimmed cups. For example, the paperboard cupstock can be subjected to a coating procedure with a material that can be provided depending on the end use of the cup. Various coatings can be used depending on the food or liquid that may be dispensed into the cup. Example coatings can be composed of low-density polyethylene (LDPE), polylactic acid (PLA), or water-based coatings. The coatings can be provided with certain properties such as impermeability, and the like. A coating can be provided on a single side of the cupstock over its full width, such that the coating will be on the inner surface of the cup. However, coatings can be provided on both sides of the cupstock. The inner coating can be designed for contact with the liquid within the cup, and the outer coating can be designed for other purposes, such as reducing condensation and the like. In addition, multiple coatings can be applied on top of each other, and such coatings can be composed of the same or different materials depending on the desired functionality. The coating can form a continuous layer on the outside of part or all of the cupstock. Various optional coating processes could also be used in which part or all of the width of the cupstock may be coated.

In some implementations, the coating can provide enhanced properties to the paperboard cupstock. For example, when an LDPE coating layer is applied to the cupstock, it has been found that the RFI or sub-components can be generally maintained and even increased compared to the raw paperboard cupstock. In contrast, it has been found that a water-based coating can lead to an RFI/sub-component decrease. Thus, depending on the coating treatment to be performed, the baseline RFI and/or sub-components of the raw paperboard cupstock can be adapted accordingly to ensure that the final treated cupstock has an RFI and sub-components in the desired operating window.

EXAMPLES & EXPERIMENTATION

Experiments were conducted to assess the ability of a number of cupstocks to form an adequate integral rim when making a rimmed cup.

It was found that cupstocks made from recycled fibers tended to have different properties compared to cupstocks made from virgin fibers. It was then found that cupstocks made from recycled paper had RFI, $RFI_{FC}$ and $RFI_{SC}$ notably lower than cupstocks made from virgin fibers. The experiments then showed that cupstock made from recycled fibers could be provided with an appropriate balance of flexural rigidity (e.g., bending stiffness) and compression strength (e.g., ring crush) as well as thickness and areal density such that the cupstock could have RFI values similar to that of cupstocks made from virgin fibers, which interestingly led to the formation of quality cup rims.

An example RFI optimal operating window was developed, which facilitated consistent formation of quality rims using cupstock made from high proportions of recycled paper or fibers. FIG. 5 illustrates an example operating widow of (1+ε) and RCT/36ρ, where good rim formation can be achieved using 100% OCC. Note that the square encompasses the data points where a good rim was formed, but that the square should be seen as exemplary and illustrative of these particular experiments. Other adequate operating windows can also be determined based on other operating conditions, equipment, and raw feedstock materials.

FIGS. **6*a* to 6*d* are additional graphs that illustrate cupstocks that have properties that fall within a preferred operating envelope for good rim formation, as well as some counterexamples of lower quality. In these figures, five different formulations of cupstock were tested. Cupstocks A and E are outside a preferred operating range. Cupstocks B to D were within the preferred operating range. It is noted that cupstocks B and C included recycled fibers. It has also been found that not providing a cupstock with flexural and structural properties that are above respective minima or within certain ranges may result in a required reduction in processing speed for cup and rim formation using a cup forming machine to meet quality specifications. This speed reduction could, in turn, be detrimental to the cost effectiveness of the cup forming process. For example, it was found that cupstocks with the desired properties as described herein could be formed into cups at a rate of about 305 cups per minute using a standard cup forming machine, but cupstocks without the desired properties could only be formed at a rate of 165 or even 130 cups per minute. Thus, the cupstocks as described herein can also facilitate high operating speeds in the cup formation process. FIGS. 7*a* to 7*d*** illustrate the data with other variables.

Regarding example test methods for certain properties of the cupstock, the following in a list of Tappi methods that can be used:

Conditioning of samples T402 sp-13
Basis weight T410 om-13
Thickness T411 om-15
Ring crush T822 om-16
Short span compression test T826 om-13
Bending stiffness T556 om-16
Surface smoothness T538 om-96

The invention claimed is:

1. A paperboard cupstock comprising fibers that are predominantly derived from recycled paper for formation into a cup having an integral upper rim, the cupstock having a rim-formation index (RFI) above a predetermined threshold, the RFI being determined based on a thickness of the cupstock, a machine direction ring crush of the cupstock, a machine direction bending stiffness of the cupstock and an areal density of the cupstock.

2. The cupstock of claim 1, wherein the predetermined threshold of the RFI is 450 J/kg.

3. The cupstock of claim 1, wherein the fibers used in the cupstock are at least 80 wt % derived from recycled paper.

4. The cupstock of claim 1, wherein the paperboard cupstock is formed as a multi-ply board.

5. The cupstock of claim 1, wherein the paperboard cupstock is formed as a two-ply board.

6. The cupstock of claim 1, wherein the paperboard cupstock is calendered.

7. The cupstock of claim 1, wherein the RFI has the following formula:

$$RFI = \frac{RCT}{36\,\rho}(1+\varepsilon) \text{ where } \varepsilon = \frac{t^2 RCT}{S_b};$$

wherein RCT is the machine direction ring crush of the cupstock; ρ is the areal density of the cupstock; t is the thickness of the cupstock; $S_b$ is machine direction bending stiffness.

8. The cupstock of claim 7, wherein the predetermined threshold is determined based on a predetermined RCT/36ρ between about 400 and about 550 J/Kg.

9. The cupstock claim 7, wherein the predetermined threshold is determined based on a predetermined (1+ε) between about 1.03 and about 1.05.

10. The cupstock of claim 7, wherein the predetermined threshold is between 370 and 580 J/Kg.

11. The cupstock of claim 7, wherein the RFI is within a predetermined range that is about 430 to about 500 J/Kg.

12. The cupstock of claim 7, wherein the RFI is within a predetermined range that is about 370 to about 580 J/Kg.

13. The cupstock of claim 12, wherein the thickness is between 250 μm and 500 μm, the machine direction ring crush is between 60 and 260 pounds per six inches, the machine direction bending stiffness is between 4 and 55 mNm, and the areal density of the cupstock can be between 0.15 and 0.4 $Kg/m^2$.

14. The cupstock of claim 13, wherein the cupstock further has a rugosity of less than about 400 Sheffield units.

15. The cupstock of claim 1, wherein all of the fibers used in the cupstock are derived from recycled paper.

16. The cupstock of claim 15, wherein all of the recycled paper that is used is derived from old corrugated cardboard (OCC).

17. The cupstock of claim 15, wherein at least some of the recycled paper includes or is derived from old corrugated cardboard (OCC), trim material and/or off-specification material from a corrugated cardboard manufacturing process.

18. A paperboard cupstock comprising fibers that are predominantly derived from recycled paper for formation into a cup having an integral upper rim, the cupstock having a rim-formation index (RFI) that is proportional to a deformation factor and a compression strength factor, and wherein the RFI is provided such that the deformation factor and the compression strength factor are within a selected RFI envelope.

19. The cupstock of claim 18, wherein the deformation factor is (1+ε) where ε is:

$$\varepsilon = \frac{t^2 RCT}{S_b}$$

where t is the thickness of the cupstock, RCT is the ring crush in the machine direction, and $S_b$ is the bending stiffness in the machine direction.

20. The cupstock of claim 18, wherein all of the fibers used in the cupstock are derived from recycled paper.

21. The cupstock of claim 18, wherein the deformation factor is between about 1.03 and about 1.05.

22. The cupstock of claim 21, wherein the compression strength factor is above about 400 J/Kg, above about 420 J/Kg, above about 430 J/Kg, above about 440 J/Kg or above about 450 J/Kg.

23. The cupstock of claim 22, wherein the compression strength factor is below about 550 J/Kg.

24. A rimmed cup made from the cupstock as defined in claim 1.

25. A process for manufacturing a cupstock for use in making a rimmed cup with an integral rim, the process comprising:

pulping recycled paper to form a pulp;

screening and cleaning the pulp to form a screened pulp;

refining the screened pulp to form a refined pulp;

subjecting the refined pulp to sheet formation to form the cupstock; and controlling one or more of steps of the process such that the cupstock roll has a rim-formation index (RFD, wherein (i) the RFI is above a predetermined threshold and is determined based on a thickness of the cupstock, a machine direction ring crush of the cupstock, a machine direction bending stiffness of the cupstock and an areal density of the cupstock; or (ii) the RFI is proportional to a deformation factor and a compression strength factor, and wherein the RFI is provided such that the deformation factor and the compression strength factor are within a selected RFI envelope; or (iii) the RFI is above a predetermined threshold and is based on a ratio between compression strength and flexural rigidity.

26. The process of claim 25, wherein subjecting the refined pulp to sheet formation comprises:

spreading the refined pulp to produce a pulp layer;

draining the pulp layer to form a ply;

combining plys together to form a multi-ply paperboard;

pressing the multi-ply paperboard to form a pressed board;

drying the pressed board to form a dried board that forms the cupstock;

calendering the dried board to form a calendered board that forms the cupstock; and winding the calendered board to form a cupstock roll of the cupstock.

* * * * *